United States Patent
Gu et al.

(10) Patent No.: US 7,281,378 B2
(45) Date of Patent: Oct. 16, 2007

(54) SURGE CONTROL SYSTEM FOR A COMPRESSOR

(75) Inventors: Ronglei Gu, Saitama (JP); Yasuo Fujikawa, Tokyo (JP); Yoshikiyo Watanabe, Saitama (JP); Atsushi Ishii, Chiba (JP)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 10/566,491

(22) PCT Filed: Aug. 8, 2003

(86) PCT No.: PCT/US03/25029

§ 371 (c)(1),
(2), (4) Date: Aug. 3, 2006

(87) PCT Pub. No.: WO2005/017329

PCT Pub. Date: Feb. 24, 2005

(65) Prior Publication Data

US 2007/0039320 A1   Feb. 22, 2007

(51) Int. Cl.
F02B 29/04   (2006.01)
(52) U.S. Cl. .................................. 60/599; 60/605.2
(58) Field of Classification Search .............. 60/599, 60/605.1, 605.2, 612
See application file for complete search history.

(56) References Cited

U.S. PATENT DOCUMENTS

| | | | |
|---|---|---|---|
| 4,394,812 A | 7/1983 | Mezger | |
| 5,173,021 A | 12/1992 | Grainger et al. | |
| 5,355,677 A | 10/1994 | Hawkins et al. | |
| 6,324,848 B1 * | 12/2001 | Gladden et al. | 60/612 |
| 6,327,980 B1 * | 12/2001 | Chen et al. | 105/26.05 |

FOREIGN PATENT DOCUMENTS

| | | |
|---|---|---|
| DE | 4118265 | 4/1991 |
| GB | 2163483 | 2/1986 |
| GB | 244312 A | 11/1991 |
| JP | 60201025 | 11/1985 |
| JP | 20011355453 | 12/2001 |
| US | PCT/US03/25029 | 8/2003 |

* cited by examiner

Primary Examiner—Hoang Nguyen
(74) Attorney, Agent, or Firm—Chris James

(57) ABSTRACT

A compressor active surge control system that includes an air recirculation line that has a first end connected downstream of a compressor outlet and a second end connected upstream of a compressor inlet. The gas recirculation line recirculates compressed air from the compressor outlet to the compressor inlet. Also included in the system is a mixer positioned to receive both ambient air and recirculated air. Mixing of the air homogenizes the air prior to its introduction into the compressor. An air cooler may be included that cools the recirculated air prior to its introduction into the compressor. Cooling and mixing of the recirculated air expands the operating range of the compressor by reducing the incidence of surge. Various existing components, such as intercoolers and filters, may serve the additional duty of cooling or mixing the recirculated air.

30 Claims, 10 Drawing Sheets

SURGE CONTROL SYSTEM FOR A COMPRESSOR

BACKGROUND OF THE INVENTION

1. Field of the Invention

The present invention is related to the use of compressor systems (e.g., turbochargers) for boosting the power output of combustion engines, and in particular to the use of recirculated compressor discharge air to facilitate the operation of such compressors.

2. Description of Related Art

Vehicle engine turbochargers provide an advantageous boost to engine power, especially at higher engine speeds. A turbocharger uses the exhaust gasses from an engine to drive a turbine that drives a compressor, which, in turn, increases the pressure of the engine intake air. The compressed engine intake air results in the boost of engine power. In some turbocharger engine systems, a portion of the exhaust gases from the engine is recirculated back to the intake of the engine to control emissions. In other systems, the compressor drive may be electrically assisted or the turbine may include a variable geometry nozzle to further increase performance.

In certain circumstances, a turbocharger can experience what is commonly referred to as a "surge" condition. Generally, surge occurs when the compressor is driven into low-flow, high pressure-ratio conditions, the result of which is that the compressor blades are forced to operate at such high incidence angles that significant flow separation occurs on the blades. Surge can result in severe aerodynamic fluctuations within the compressor of the turbocharger and can even cause damage to the engine or its intake pipe system.

In one instance, surge can occur when compressor exhaust gas recirculation flow is relatively high at low engine speed. The remaining engine cylinder volume for fresh air at this point becomes smaller. In order to maintain engine torque and load performance, the boosting pressure needs to increase (thereby increasing air density) to keep the same mass flow rate of fresh air into the engine. As a result, the compressor has to work at a relatively higher load and pressure ratio, while the airflow remains relatively low.

In another instance, surge can occur when a relatively high specific power output (such as 70 to 80 kilowatts per liter) is required of the engine and electrically assisted boosting of the compressor is employed. In still another instance, surge can occur when a quick compressor response is required using electrical boosting and/or the use of variable turbine nozzle vanes. In another instance, sudden deceleration of the engine due to closing of the throttle valve can result in surge.

It would be advantageous, therefore, to reduce the occurrence of surge in a turbocharger. Reducing such occurrence would allow an expanded range of conditions in which the turbocharger would be able to boost engine power.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Figure 1:
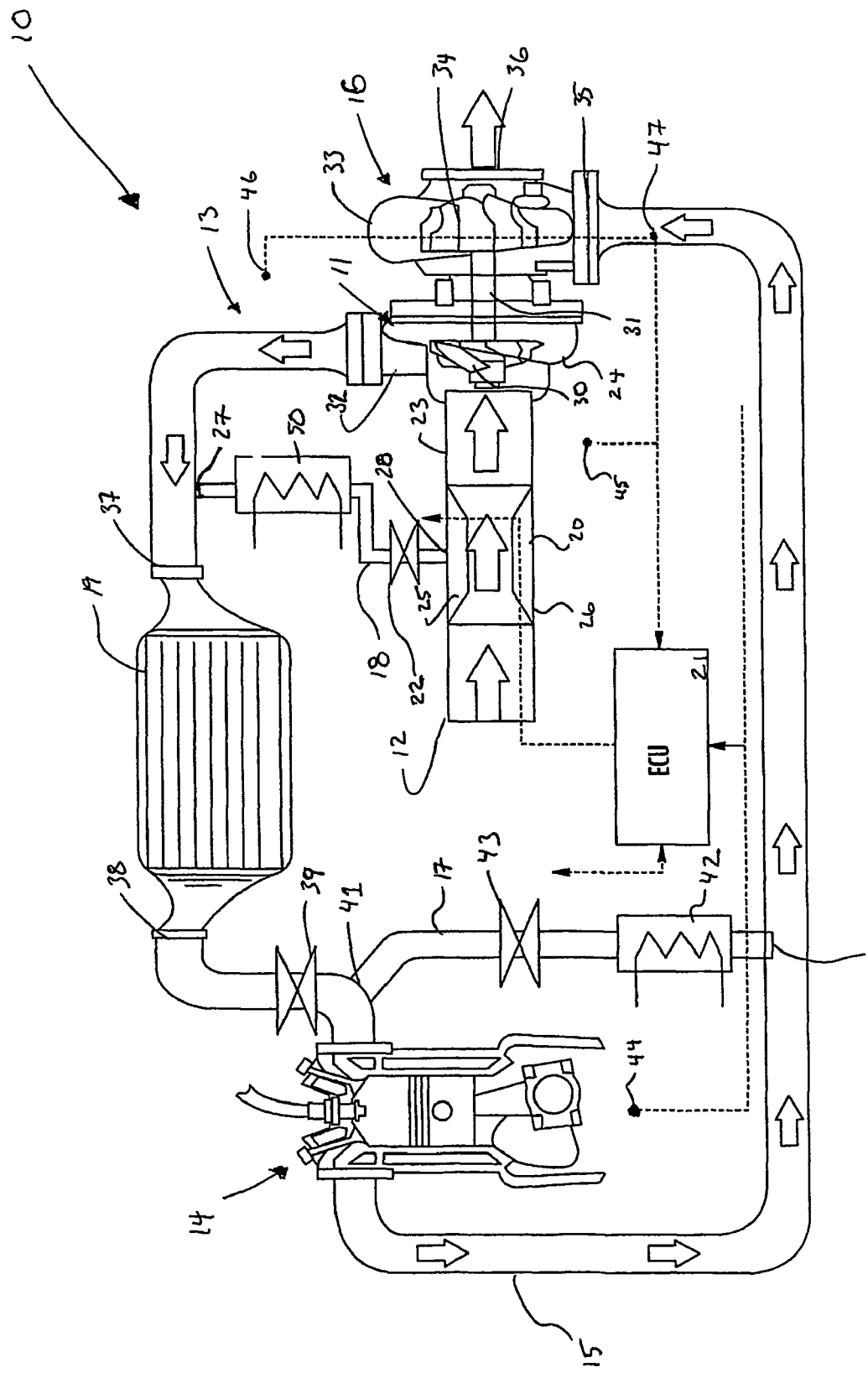
FIG. 1 is a schematic of a surge control system of one embodiment of the present invention.

A compressor active surge control system 10 of one embodiment of the present invention, as shown in FIG. 1, includes a compressor 11, a compressor inlet line 12, a compressor discharge line 13, a recirculation line 18 connecting the inlet and discharge lines, an air cooler 50 and an air mixer 20. Generally, the compressor 11 supplies compressed air through the line 13 to a combustion engine 14 so as to increase power output by the engine. An exhaust gas line 15 conducts exhaust from the engine 14 to a turbine 16 which drives the compressor 11. An exhaust gas recirculation line 17 may optionally be used to recirculate exhaust gas back to the engine 14's intake for control of engine emissions.

The compressor inlet pipe or line 12 is connected to an ambient air source, such as by being connected to an intake scoop (not shown) beneath the hood of an automobile. The term "ambient" as used herein broadly defines air from a general supply of air, and not necessarily air at a temperature, pressure or cleanliness of the surrounding environment. Generally, then, the ambient air is any air (or other gas) that is useable for combustion, but is at a pressure lower than the air discharged from the compressor 11.

The term "line" as used herein may include pipes, tubes, hoses or any other conduit, device or method for conducting air or other fluids from one place to another. In addition, although the term "line" may be used in singular form, it may indicate use of several lines, tubes, conduits, portions or combinations thereof, that are effective in conducting a fluid (such as air) from one place to another. For instance, the present invention need not be limited to a single compressor inlet line 12 as multiple inlet hoses could be used depending upon the amount of ambient air required for compression and combustion. Also, as used herein "line" does not necessarily indicate that the pipe or hose travels directly from one place to another, but could also include intervening stops for supplying other devices, branches or twists and turns.

The inlet line 12, which is downstream of an air filter (not shown) in the embodiment depicted in FIG. 1, is connected at a downstream end to the recirculation mixer 20. As illustrated, the mixer 20 includes a length of pipe 26 containing a cylindrical filter or baffle 25 housed within the pipe. Defined by the cylindrical baffle is a central opening that extends co-axially with the opening of the pipe 26. The upstream end of the mixer pipe is fitted to the downstream end of the inlet line 12 while the opposite, downstream end of the mixer pipe is fitted to an inlet duct 23. The inlet duct is part of a shroud or housing 24 of the compressor 11 and can have a diameter the same as the mixer pipe 26.

Defined within the sidewall of the mixer pipe 26 is an opening to which a second end 28 of the recirculation line 18 is attached. Connection with the recirculation line allows entry of the recirculated air into the mixer 20 so that it can be mixed with the main, ambient air supply from the inlet line 12, as will be described in more detail below. An advantage of the cylindrical baffle or filter of the mixer 20 is that its central opening is oriented with the direction of the ambient air so that it mixes with the recirculated airflow with minimal impedance of the flow.

Although the mixer 20 is illustrated in FIG. 1 as having the pipe 26 and cylindrical filter 25, other mixer devices may also be employed. For instance, a baffle could be used that does not filter, but redirects airflow to cause turbulence and mixing. Also, conventional, pre-existing air filters could be used such as off-the-shelf paper or oil-impregnated foam filters. In such a case, an additional opening may be formed in the filter and a fitting used to attach the second end 28 of the recirculation line 18. In another alternative (as described below) flow from the inlet line 12 and the recirculation line 18 is combined upstream of the mixer 20 by a direct connection between the lines.

Referring again to the embodiment illustrated in FIG. 1, the compressor 11 is a rotationally driven compressor having a plurality of compressor blades 30 mounted to a rotatable shaft 31 driven by the turbine 16. A volute 24 surrounds the compressor for receiving pressurized air discharged from the compressor. A discharge or outlet duct 32 is connected from the volute 24 to an upstream end of the discharge line 13.

As noted above, the compressor 11 is driven by the turbine 16. The turbine 16 includes an inlet volute 33 that receives exhaust gases from the engine 14 via the line 15 and via an inlet 35 to the volute. The turbine includes turbine blades 34 mounted on the shaft 31. The turbine housing defines a turbine outlet 36 through which the exhaust gases are discharged after passing through the turbine. The turbine outlet 36 is attached to the downstream exhaust system (not shown) of the power plant.

Although the compressor in the illustrated embodiment is shown as being driven by a turbine powered by engine exhaust gas (e.g., a turbocharger), other alternative drives could be used to power the compressor 11. For instance, the compressor could be mechanically driven by the engine drive shaft (e.g., a supercharger) or the compressor could be driven by an electrical motor. In another instance, the turbine drive of the illustrated embodiment could be assisted by another drive, such as an electrical drive (electrically assisted) or the engine drive shaft.

Returning to the intake air compression portion of the system 10, the outlet duct 32 of the compressor is connected to discharge line 13 which extends to the air cooler 19. The illustrated air cooler 19 is an intercooler which typically houses a plurality of tubes through which the relatively hot, compressed air flows from the compressor 11. Generally, ambient air (or water) passes over the tubes and between fins that are attached to the tubes. Heat is then transferred from the hot tubes and fins to the cool ambient air. The air cooler 19 includes an upstream, inlet opening 37 which is attached to the discharge line 13 and a downstream, outlet opening 38 that is attached to a downstream portion of the discharge line 13 (which may also be referred to as an engine intake line). It should be noted that other types of air coolers or heat exchangers could also be used in lieu of the illustrated intercooler.

The discharge line 13 includes a connection to a first end 27 of the recirculation line 18, a non-return valve 39, and a connection to the exhaust gas recirculation line 17. The non-return valve 39 is a one-way valve that prevents backflow of the recirculated exhaust gases and the engine intake air. The exhaust gas recirculation line 17 includes a first end 40 connected to the exhaust gas line 15 and a second end 41 connected to the downstream portion of the discharge line 13. The exhaust gas recirculation system includes its own cooler 42 and control valve 43. The exhaust gas recirculation valve 43 controls the flow of recirculated exhaust gases and may be positioned upstream, or downstream, of the exhaust gas cooler 42. Operation of the exhaust gas recirculation valve 43 is controlled by an engine control unit 21, as will be described in more detail below.

As mentioned above, the compressed air recirculation line 18 has its first end 27 connected to the discharge line 13 upstream of the air cooler 19. The opposite, second end 28 of the compressed air recirculation line 18 is connected to the mixer 20, as also described above. A recirculation valve 22 is positioned between the ends 27, 28 of the line for controlling the flow in the compressed air recirculation line 18. The recirculation valve is connected in communication with, and controlled by, the engine control unit 21, as indicated by the dashed line. The recirculation valve 22 in one embodiment is open-loop controlled by a pneumatic actuator; in another embodiment the valve 22 can be closed-loop controlled by a rotary electric actuator. Also within the recirculation line 18, is a dedicated air cooler 50 for cooling recirculated air.

In addition to being connected to the valves 22, 43, the engine control unit is also connected to an engine speed sensor 44, a compressor inlet pressure sensor 45 and a compressor outlet pressure sensor 46. For open loop control, opening of the recirculation valve 22 is a function of the engine speed as measured by the sensor 44 and the boost pressure as measured by sensor 46. For closed loop control, opening of the valve is a function of engine speed and the compressor inlet pressure as measured by sensor 45, which is capable of sensing surge. As another alternative, the recirculation valve 22 may be controlled in response to the exhaust gas recirculation rate (intake throttling) or the difference in gas pressure between the engine inlet (as measured by engine inlet pressure sensor 46) and turbine inlet (as measured by a turbine inlet pressure sensor 47).

Control of the compressed air recirculation valve 22 opening may also be coordinated with opening of the exhaust-gas recirculation valve 43 and control of the variable turbine nozzle to optimize air flow and exhaust gas recirculation rates. For instance, the compressed air recirculation valve 22 can be used to absorb the extra turbine power when the variable turbine nozzle is suddenly closed during engine braking.

Figure 2:
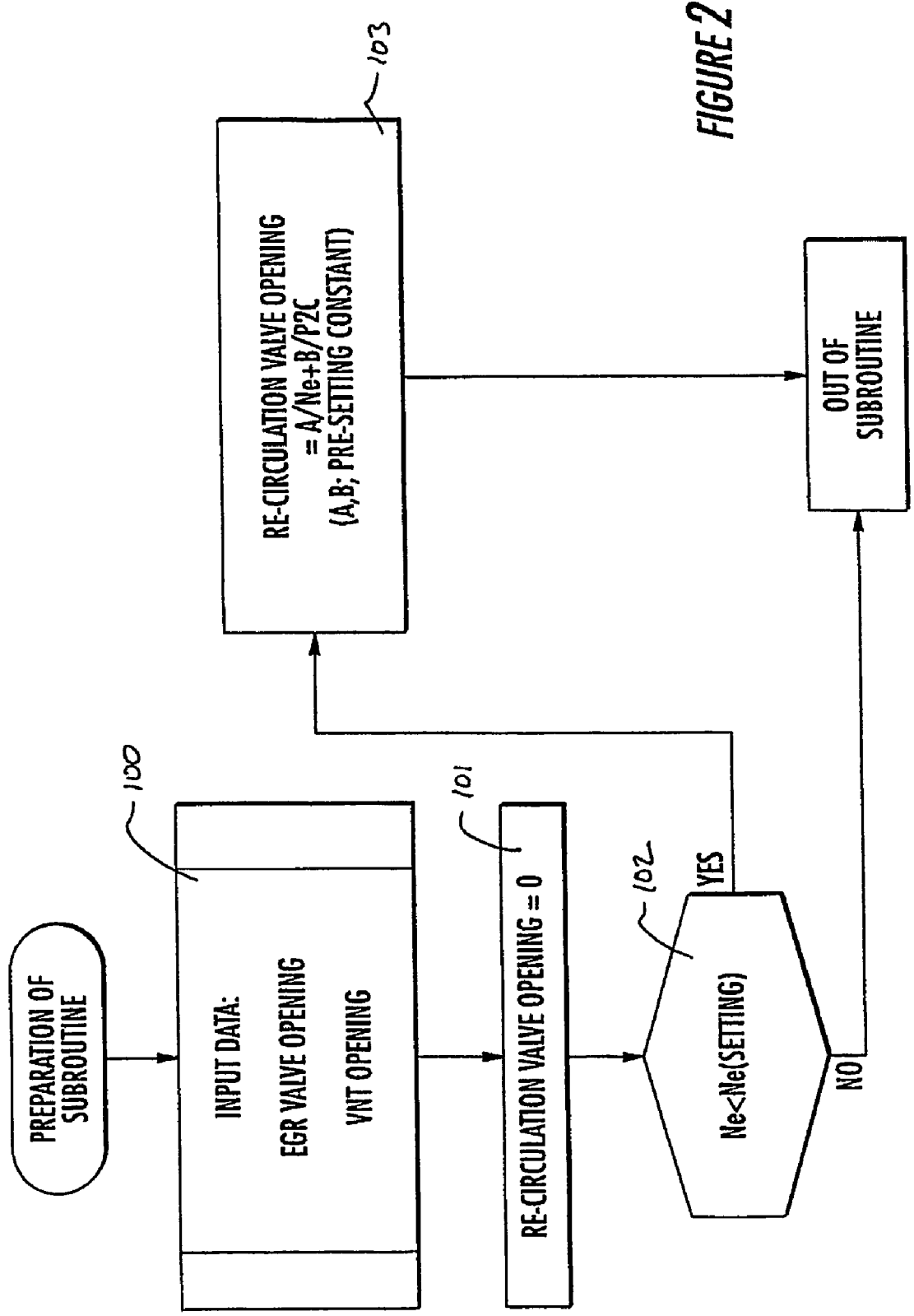
FIG. 2 is a schematic of open loop control logic of another embodiment of the surge control system of the present invention.

Open loop control of the compressed air recirculation valve 22 of another embodiment of the present invention is illustrated by the flowchart of FIG. 2. Input data, including the degree of opening of the exhaust gas recirculation valve 43 and the degree of opening of the variable nozzle turbine, are collected in step 100. The compressed gas recirculation valve opening is set to zero in step 101. Then in step 102, the engine speed (Ne) as measured by the engine speed sensor 44 is compared to a predetermined Ne threshold (Ne(setting)). If Ne is less than the threshold Ne(setting) then the recirculation valve 22 is opened in step 103. The amount of opening is defined by the following equation:

$$RVO=A/Ne+B/P2C$$

wherein RVO is the amount of compressed air recirculation valve opening, A is a predetermined constant, B is a predetermined constant, Ne is the engine speed and P2C is the outlet pressure measured by sensor 46. If Ne is determined to be more than the threshold Ne(setting) in step 102, the subroutine ends and the recirculation valve 22 is left closed.

Figure 3:
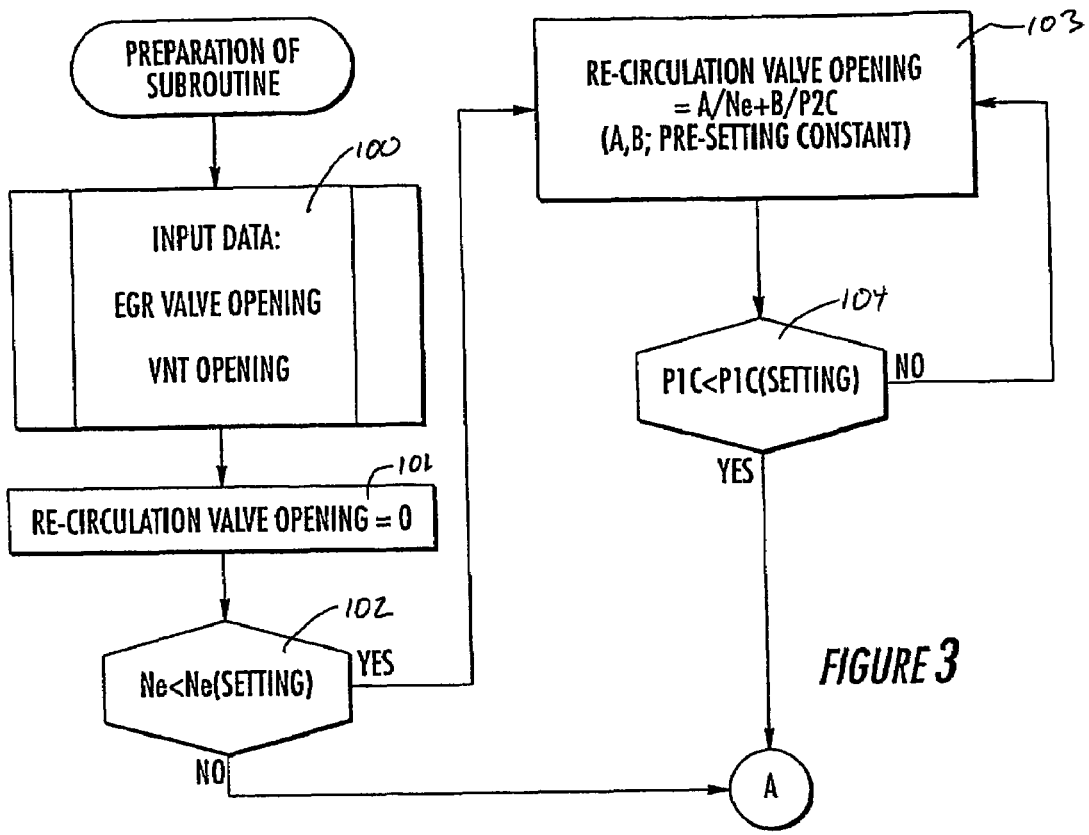
FIG. 3 is a schematic of a closed loop control logic of still another embodiment of the surge control system of the present invention.
Figure 4:
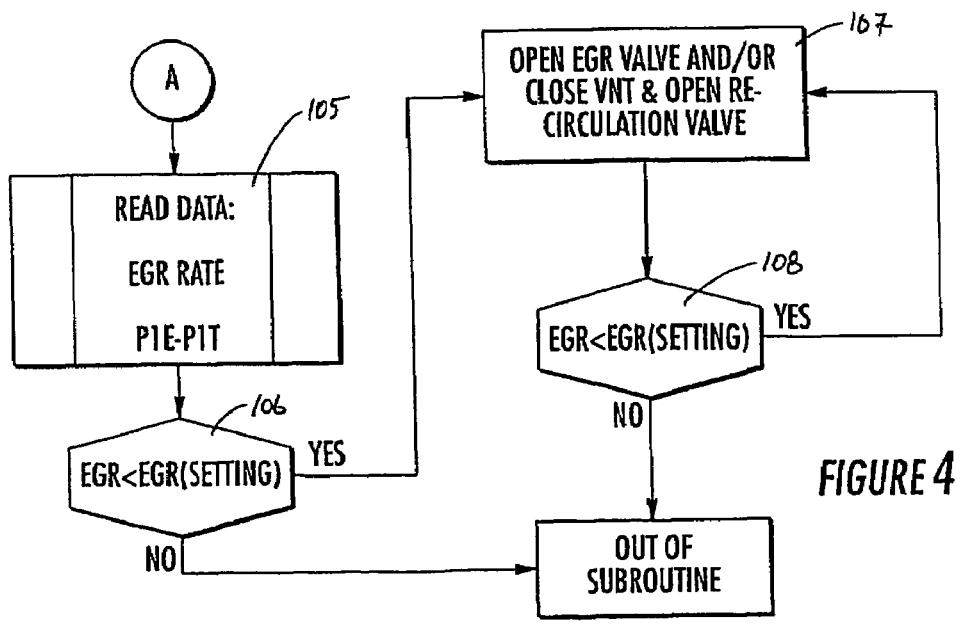
FIG. 4 is a schematic of a continuation of the closed loop control illustrated in FIG. 3.
Figure 5:
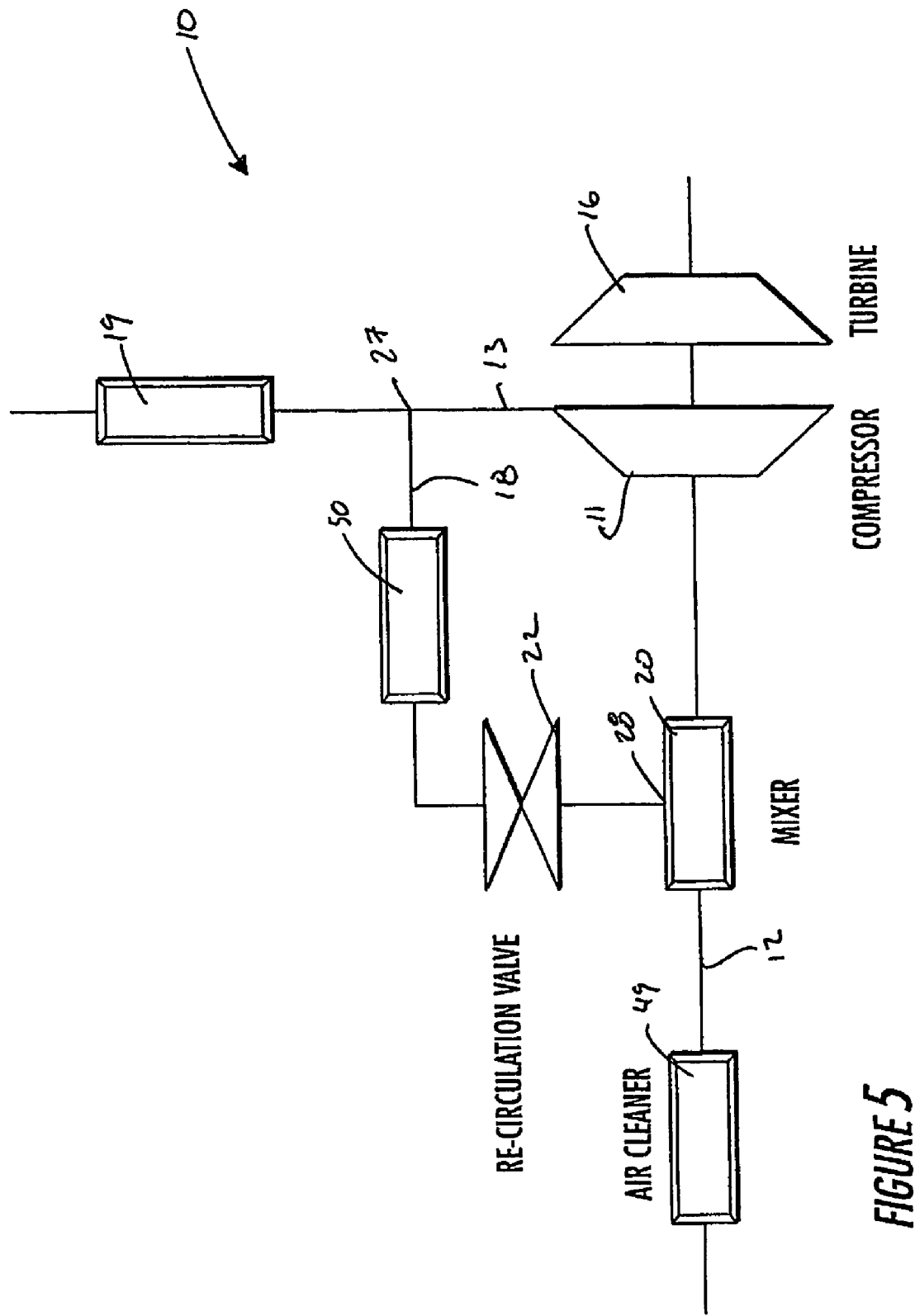
FIG. 5 is a schematic of a surge control system of another embodiment of the present invention including an air cleaner upstream of a junction between the inlet line and the recirculation line.

Closed loop control of the compressed air recirculation valve 22 of another embodiment of the present invention is illustrated by the flowchart of FIG. 3. The first four steps 100, 101, 102 and 103 are the same as described above for open loop control. However, after opening the compressed air recirculation valve 22, the compressor inlet pressure P1C as measured by sensor 45 is compared to a threshold pressure P1C(setting) in step 104. If above the threshold, the logic returns to step 103. If below the threshold (in a more severe surge condition), the logic proceeds to step 105 wherein data is collected on the exhaust gas recirculation rate (EGR) by determining the difference between engine inlet pressure (P1E) as measured by sensor 47 and turbine inlet pressure (P1T) as measured by sensor 48, as shown in FIG. 4.

In a step 106 the EGR is compared to an exhaust gas recirculation threshold EGR(setting). If the EGR is greater than EGR(setting) then the subroutine ends. If the EGR is less than EGR(setting) then the logic proceeds to step 107 wherein the exhaust gas recirculation valve 43 is opened or, alternatively, the variable nozzle turbine is closed and the compressed air recirculation valve 22 is opened. EGR is compared again to EGR(setting) in a step 108 and if still less than EGR(setting), the logic returns to step 107. The exhaust gas recirculation valve 43 is opened further, or the compressed air recirculation valve 22 is opened further. If EGR is greater than EGR(setting) then the subroutine ends.

One measure of EGR rate is based on the "mass ratio" or "mole ratio." The mass ratio is the mass flow of EGR versus the total mass flow within the engine cylinder. Generally, the desired EGR rate is about 10 to 15% at full load with medium engine speed, or high engine speed. At full load and low engine speed for European and North American commercial vehicles the EGR rate is dropped to zero. For vehicles having higher emission requirements, the EGR rate would preferably be increased to about 20% at full load with low engine speed and more than 30% at full load with medium engine speed, or at high engine speed. Typically, to maintain high mass flow of fresh air, a higher pressure ratio is necessary and the compressor more easily runs into surge.

For the EGR(setting) at a given engine condition (speed and load), the EGR(setting) is a target rate that is related to the NOx reduction rate in the cylinders. If the EGR rate is lower than the target value, NOx contents at the engine exhaust manifold will be too high and cannot clear the emission target values even with use of a de-NOx catalyst.

Other embodiments of the compressor active surge control system of the present invention are illustrated schematically in FIGS. 5-10. In one embodiment shown in FIG. 5, an air cleaner 49 is positioned upstream of the mixer 20 in the inlet line 12 and the dedicated air cooler 50 is positioned in the compressed air recirculation line 18. The junction between the first end 27 of the recirculation line 18 and the discharge line 13 is upstream of the intercooler 19.

Figure 6:
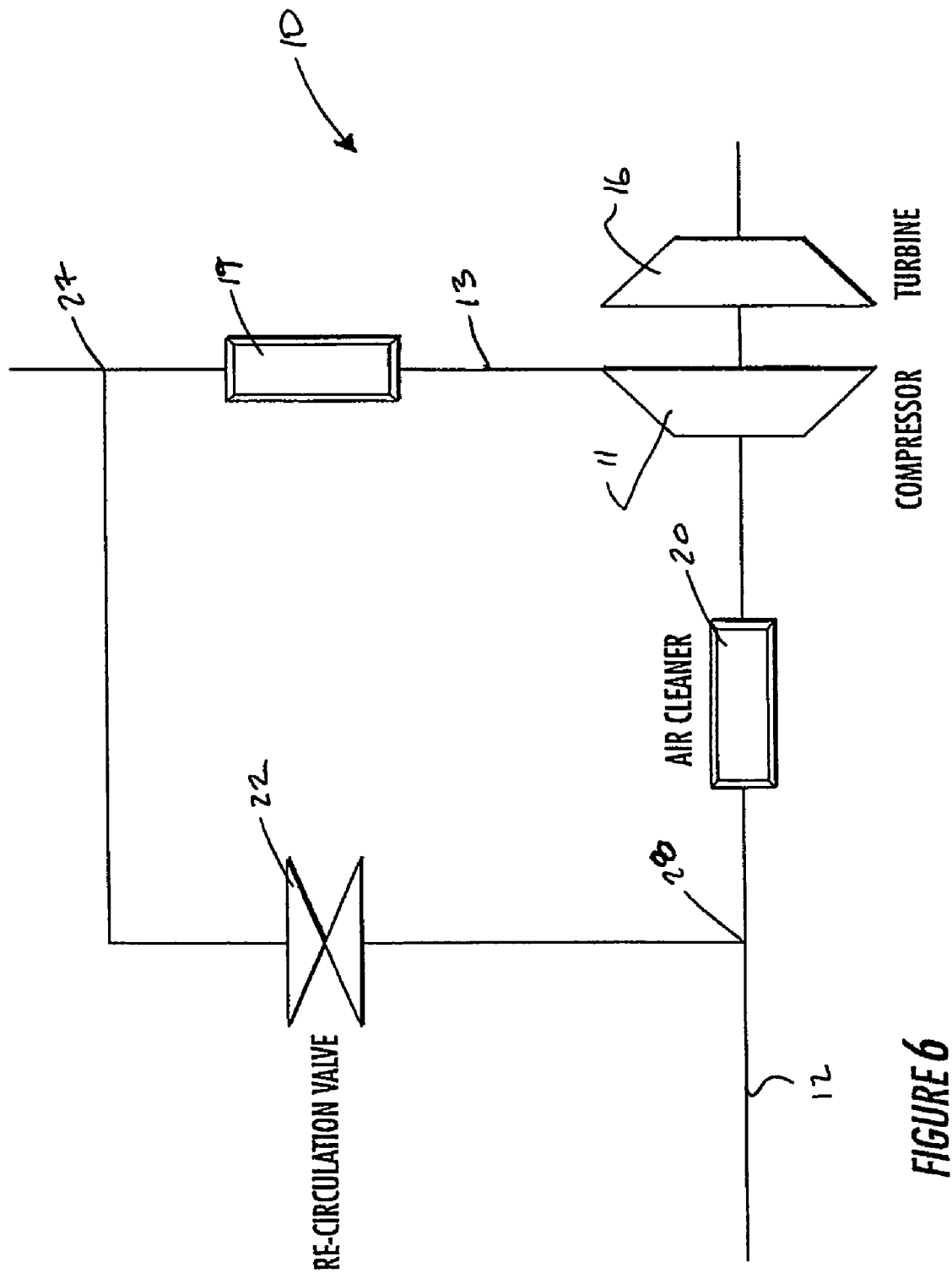
FIG. 6 is a schematic of a surge control system of still another embodiment of the present invention including an air cleaner serving as a mixer.
Figure 7:
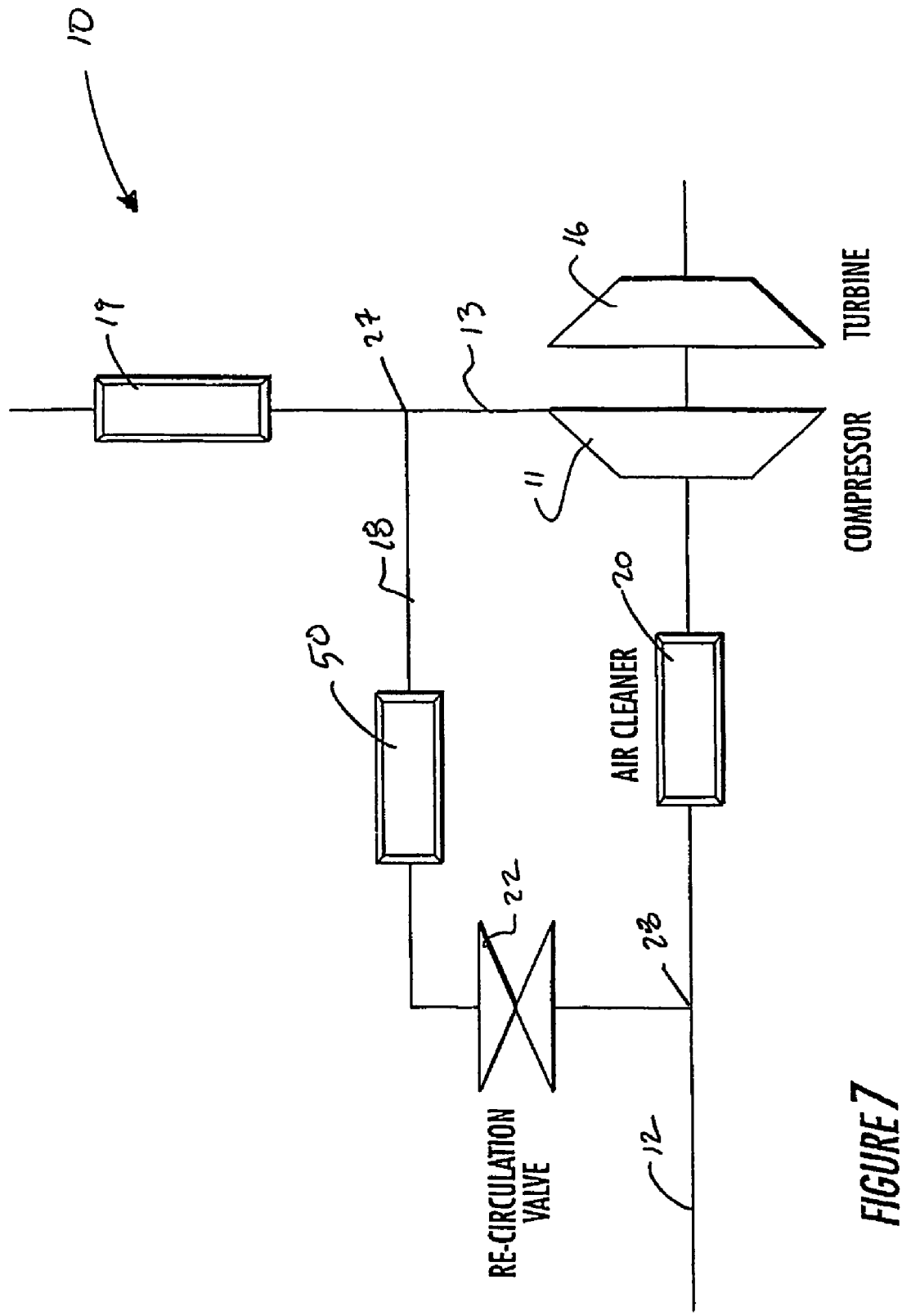
FIG. 7 is a schematic of a surge control system of yet another embodiment of the present invention including an air cleaner as mixer and a dedicated gas recirculation cooler.
Figure 8:
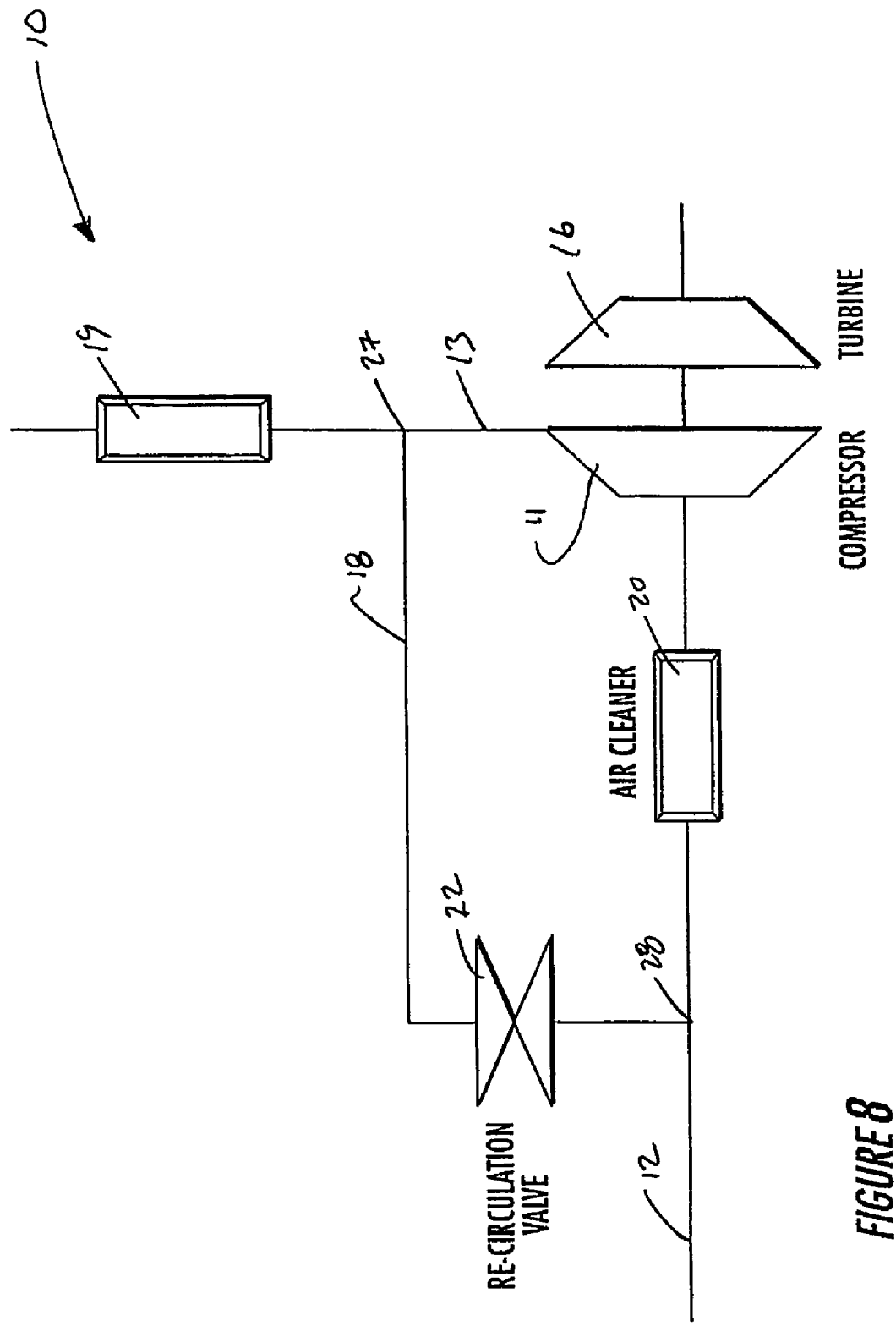
FIG. 8 is a schematic of a surge control system of another embodiment of the present invention including an air cleaner serving also as a mixer and as a cooler.

In another embodiment shown in FIG. 6, the mixer 20 is also an air cleaner which eliminates the need for an independent mixer. The junction of the first end 27 of the recirculation line 18 and the discharge line 12 is downstream of the intercooler 19, allowing the intercooler to also cool the compressor discharge air prior to its recirculation. In still another embodiment shown in FIG. 7, the mixer 20 is an air cleaner that is downstream of the junction between the inlet line 12 and the second end 28 of the recirculation line 18. In an embodiment shown in FIG. 8, the mixer 20 is an air cleaner and also serves as an air cooler, allowing the junction between the recirculation line 18 and discharge line 13 to be upstream of the cooler 19.

Figure 9:
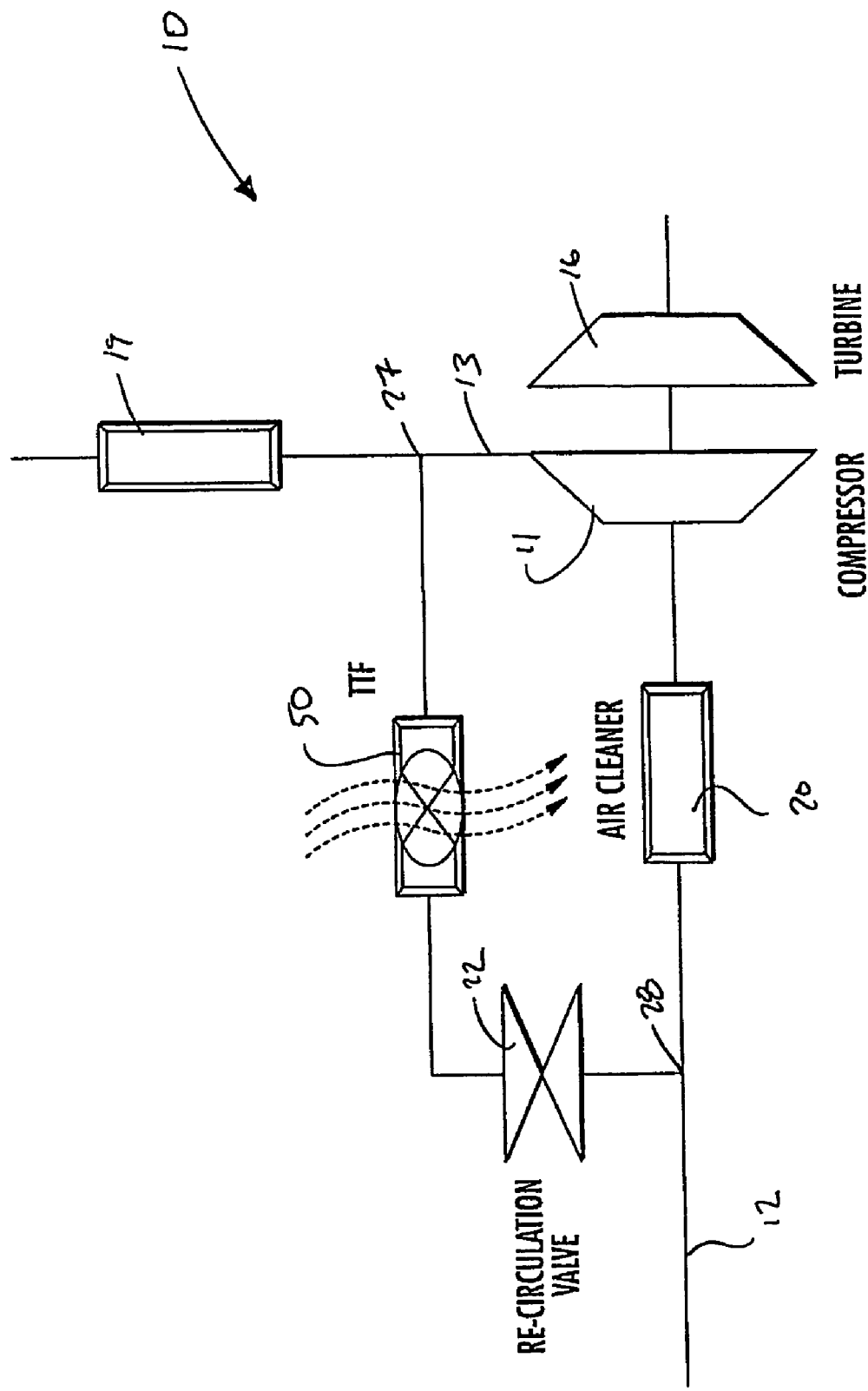
FIG. 9 is a schematic of a surge control system of another embodiment of the present invention including a tip turbine fan cooler.
Figure 10:
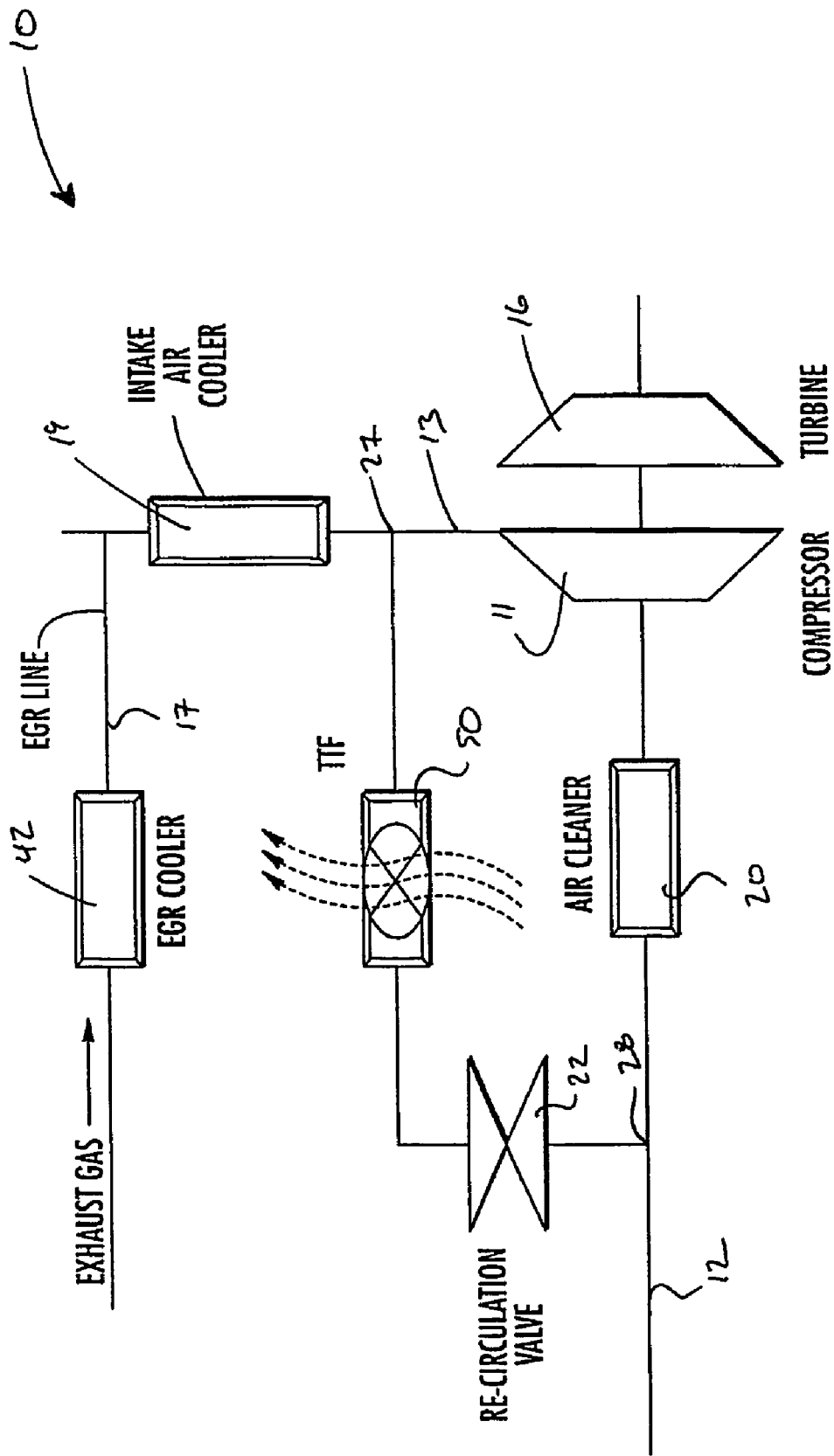
FIG. 10 is a schematic of a surge control system of still another embodiment of the present invention including the use of an exhaust gas recirculation line cooler.

In yet another embodiment shown in FIG. 9, the cooler 50 is in the compressed air recirculation line 18 and is a tip turbine fan. The tip turbine fan absorbs some of the thermal energy of the compressed air allowing it to be cooled more easily by the air cleaner type mixer 20. Another embodiment is shown in FIG. 10, which is similar to the embodiment of FIG. 9 except for the use of the exhaust gas recirculation cooler 42. In this embodiment, the exhaust gas cooler 42 can aid the intercooler 19 if the cooling effectiveness of the intercooler is not enough.

Figure 11:
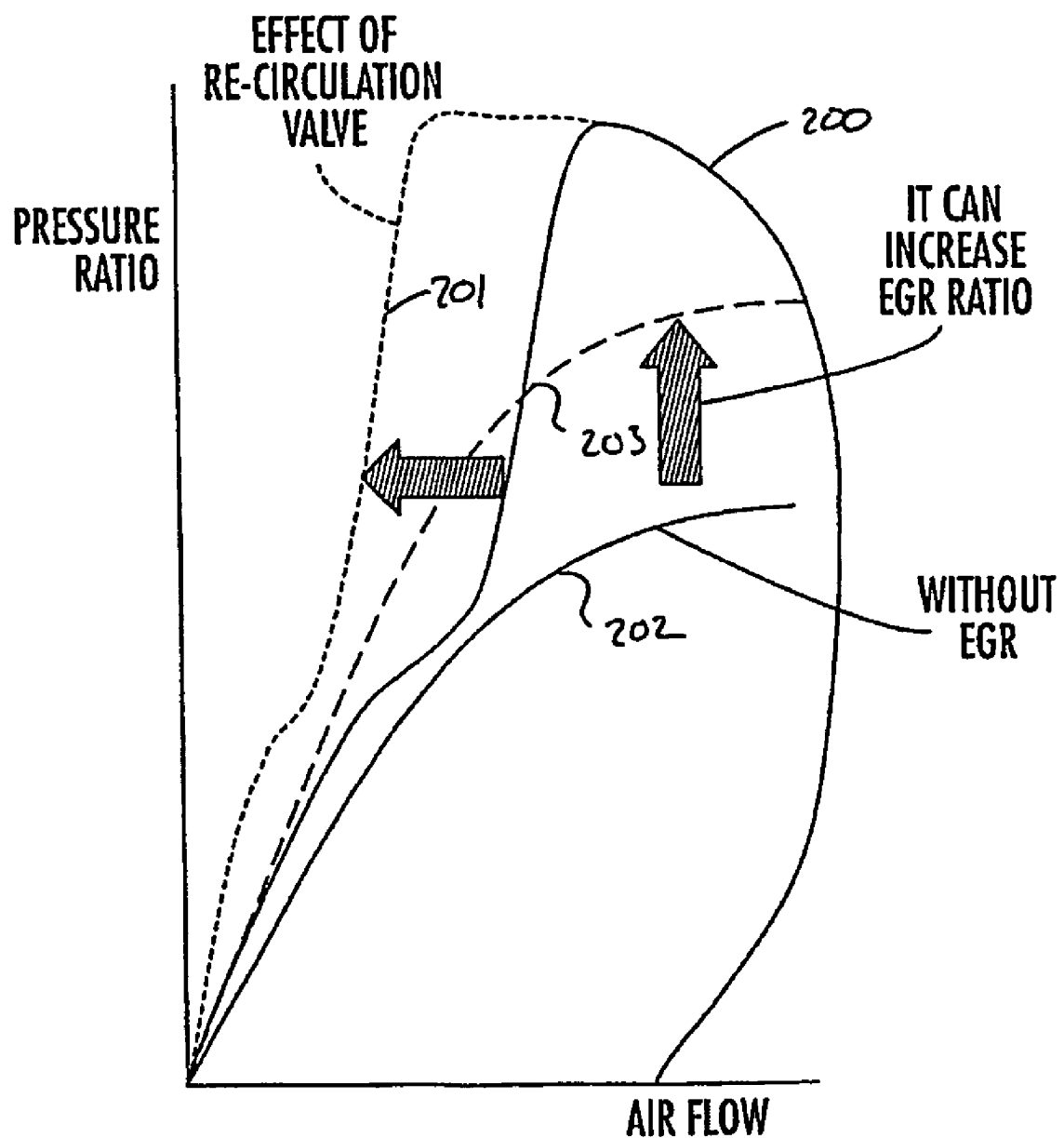
FIG. 11 is a graphical depiction of the improved compressor operating range resulting from compressed air recirculation by the surge control system of the present invention.

Surge control by the present invention has many advantages. For instance, FIG. 11 illustrates the expansion of the working area of the compressor 11 when the surge control system 10 of the present invention is used. The working envelope without compressed air recirculation is defined by a solid line 200. The solid line 202 defines the compressor operating line without exhaust gas recirculation. The dashed line 203 represents how the operating line is shifted with exhaust gas recirculation. It can be seen that the operating line at low air flow conditions is into the surge area of the map. The dotted line 201 shows how the operating envelope is expanded by compressed air recirculation in accordance with the invention; as a result, even with exhaust gas recirculation, the operating line 203 falls within the non-surge region of the map. Expansion of the operating range of the compressor system is enhanced through cooling of the recirculated air and/or mixing of the recirculated air with the intake air such that substantially uniform flow conditions exist at the entrance to the compressor. Without adequate mixing, non-uniform flow conditions would tend to hurt compressor efficiency.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodi- That which is claimed:

1. A system for supplying compressed air to a combustion engine so as to boost power output by the combustion engine, said system comprising:
a compressor having a rotary compression device positioned in a housing defining an air inlet and a compressed air outlet, wherein the air inlet is configured to supply inlet air to the rotary compression device, wherein the rotary compression device is configured to compress the inlet air and wherein the compressed air outlet is configured to allow the compressed air to exit the housing for supply to an intake of the combustion engine;
a recirculation line arranged to recirculate a portion of the compressed air discharged from the compressed air outlet back to the compressor air inlet;
a recirculation valve disposed in the recirculation line and operable to control rate of flow through the recirculation line, the recirculation valve being controllable via control signals;
a programmed controller in communication with the recirculation valve and programmed to send control signals to the recirculation valve to open the recirculation valve so as to recirculate compressed air through the recirculation line to the compressor air inlet when the engine is operating below a threshold engine speed, and to maintain the recirculation valve closed so as to prevent recirculation when the engine is operating above said threshold engine speed; and
an air cooling device connected in fluid communication with the recirculation line and operable to cool the recirculated air upstream of the compressor air inlet, wherein the cooled air from the recirculation line is combined with the inlet air upstream of the compressor air inlet, the cooled recirculated air reducing occurrence of compressor surge.

2. A system of claim 1, further comprising a compressor discharge line connecting the engine intake and the compressor outlet, wherein a first end of the recirculation line is connected to the compressor discharge line and wherein the air cooling device is connected in fluid communication with the compressor discharge line upstream of the recirculation line first end and compressor discharge line connection.

3. A system of claim 2, further comprising a recirculation valve disposed in the recirculation line and operable to control rate of flow through the recirculation line.

4. A system of claim 3, further comprising a compressor inlet line connected to the compressor housing inlet, wherein a second end of the recirculation line is connected to the compressor inlet line.

5. A system of claim 4, further comprising a mixing device connected to the recirculation line and the compressor inlet line and capable of mixing cooled, recirculated air from the recirculation line with inlet air from the compressor inlet line.

6. A system of claim 5, wherein the mixing device is an air cleaner.

7. A system of claim 5, further comprising an air cleaner connected to the compressor inlet line upstream of the mixing device.

8. A system of claim 1, further comprising a compressor discharge line connecting the engine intake and the compressor outlet, wherein a first end of the recirculation line is connected to the compressor discharge line and a second end of the recirculation line is in fluid communication with the compressor air inlet, and wherein the air cooling device is disposed between the first and second ends of the recirculation line.

9. A system of claim 8, wherein the recirculation valve is positioned between the first and second ends of the recirculation line, the recirculation valve being operable to control rate of flow through the recirculation line.

10. A system of claim 9, further comprising a compressor inlet line connected to the compressor housing inlet, wherein the second end of the recirculation line is connected to the compressor inlet line.

11. A system of claim 10, further comprising a mixing device connected to the recirculation line and the compressor inlet line and capable of mixing cooled, recirculated air from the recirculation line with inlet air from the compressor inlet line.

12. A system of claim 10, further comprising a mixing device connected to the compressor inlet line downstream of the recirculation line second end and compressor inlet line connection.

13. A system of claim 12, wherein the mixing device is an air cleaner.

14. A system of claim 1, wherein the air cooling device is an air cleaner.

15. A system of claim 14, further comprising a compressor inlet line connected to the compressor housing inlet, wherein the recirculation line is connected to the compressor inlet line.

16. A system of claim 15, wherein the air cleaner is connected to the compressor inlet line downstream of the recirculation line and compressor inlet line connection, and wherein the air cleaner is also configured to mix recirculated and inlet air.

17. A system of claim 16, further comprising a compressor discharge line connecting the engine intake and the compressor outlet, wherein the recirculation line is connected to the compressor discharge line.

18. A system of claim 17, further comprising a second air cooler connected in fluid communication with the compressor discharge line downstream of the recirculation line and compressor discharge line connection.

19. A system of claim 1, wherein the cooling device is a tip turbine fan.

20. A system of claim 19, further comprising a compressor inlet line connected to the compressor housing inlet, wherein the recirculation line is connected to the compressor inlet line.

21. A system of claim 20, further comprising a mixing device connected to the compressor inlet line downstream of the recirculation line and compressor inlet line connection.

22. A system of claim 21, further comprising a compressor discharge line connecting the engine intake and the compressor outlet, wherein a first end of the recirculation line is connected to the compressor discharge line and a second end of the recirculation line is in fluid communication with the compressor air inlet, and wherein the air cooling device is disposed between the first and second ends of the recirculation line.

23. A system of claim 22, further comprising an exhaust gas recirculation line connected to the compressor discharge line downstream of the recirculation line second end and compressor discharge line connection.

24. A system of claim 23, further comprising an exhaust gas cooling device connected to the exhaust gas recirculation line.

25. A system of claim 24, further comprising a second air cooling device connected to the compressor discharge line downstream of the recirculation line second end and compressor discharge line connection and upstream of the exhaust gas recirculation line and compressor discharge line connection.

26. A system for supplying compressed air to a combustion engine so as to promote power output by the combustion engine, said system comprising:

a compressor having at least one inlet and at least one outlet, said inlet connected in fluid communication with an ambient air intake and said outlet in fluid communication with an engine intake;

a recirculation line having a first end connected in fluid communication with the compressor outlet and a second end connected in fluid communication with the compressor inlet;

an air cooling device connected in fluid communication with the recirculation line and capable of cooling recirculated air upstream of the compressor inlet;

a recirculation valve disposed in the recirculation line and operable to control rate of flow through the recirculation line, the recirculation valve being controllable via control signals;

a programmed controller in communication with the recirculation valve and programmed to send control signals to the recirculation valve to open the recirculation valve so as to recirculate compressed air through the recirculation line to the compressor air inlet when the engine is operating below a threshold engine speed, and to maintain the recirculation valve closed so as to prevent recirculation when the engine is operating above said threshold engine speed; and an air mixing device connected in fluid communication with the recirculation line between the air cooling device and the compressor inlet wherein the air mixing device is capable of mixing the cooled air and the ambient air upstream of the compressor housing inlet so as to reduce occurrence of compressor surge.

27. A method of actively controlling compressor surge in an engine system wherein air is compressed in a compressor and supplied to an intake of an internal combustion engine, said surge controlling method comprising:

supplying air to an inlet of the compressor;

compressing the air in the compressor;

discharging compressed air from the compressor through a compressor discharge line to the intake of the internal combustion engine;

providing a recirculation line connecting the compressor discharge line to the compressor inlet;

providing a controllable recirculation valve in the recirculation line for controlling an amount of flow through the recirculation line;

opening the valve and recirculating compressed air from the compressor discharge line to the compressor inlet when the engine is operating below a threshold engine speed, and maintaining the valve closed so as to prevent recirculation when the engine is operating above said threshold engine speed;

cooling the recirculated air; and feeding the cooled recirculated air back to the compressor inlet.

28. A method of claim 27, further comprising mixing the cooled recirculated air with the air being supplied to the compressor inlet such that flow conditions entering the compressor are more uniform than would exist without said mixing.

29. A method of claim 27, wherein an amount of the valve opening (RVO) is a function of the engine speed and the outlet air pressure.

30. A method of claim 29, wherein the amount of valve opening (V) is defined by:

$$RVO = A/Ne + B/P2C$$

wherein A and B are predetermined constants, Ne is the engine speeed and P2C is the outlet air pressure.

* * * * *